United States Patent
Forshee et al.

(10) Patent No.: US 6,702,313 B2
(45) Date of Patent: Mar. 9, 2004

(54) WHEELCHAIR ATTACHABLE SHOPPING CART

(76) Inventors: Darren C. Forshee, 1408 Teasly La., Denton, TX (US) 76205; Brian B. Reed, Rte. 2, Box 709, Nacona, TX (US) 76255

( * ) Notice: Subject to any disclaimer, the term of this patent is extended or adjusted under 35 U.S.C. 154(b) by 0 days.

(21) Appl. No.: 10/152,968

(22) Filed: May 21, 2002

(65) Prior Publication Data

US 2003/0218312 A1 Nov. 27, 2003

(51) Int. Cl.[7] ............................................. B62D 27/12
(52) U.S. Cl. ........................ 280/304.1; 280/33.992
(58) Field of Search .................... 280/304.1, 33.993, 280/33.992, 33.997, 33.996, 33.991

(56) References Cited

U.S. PATENT DOCUMENTS

| | | | | |
|---|---|---|---|---|
| 4,257,545 A | * | 3/1981 | Rhyan | 224/42.43 |
| 4,305,601 A | * | 12/1981 | Berge | 280/289 WC |
| 4,484,755 A | * | 11/1984 | Houston | 280/33.99 A |
| 5,312,122 A | * | 5/1994 | Doty | 280/33.992 |
| 5,848,797 A | * | 12/1998 | Paez | 280/33.993 |
| 6,364,326 B1 | * | 4/2002 | Reiland et al. | 280/33.993 |
| 6,572,122 B2 | * | 6/2003 | Johnson et al. | 280/33.993 |
| 2001/0035619 A1 | * | 11/2001 | Reiland et al. | 280/33.993 |

FOREIGN PATENT DOCUMENTS

JP        2002-205653        * 7/2002

* cited by examiner

*Primary Examiner*—Avraham Lerner
(74) *Attorney, Agent, or Firm*—John E. Vandigriff

(57) ABSTRACT

A shopping cart is securely attachable to the foot rest supports of a wheel chair in a manner allowing a person to enter and depart the wheelchair while the cart is attached. Two attachable arms that are moveavble horizontally and vertically attached to the each foot rest support in a low position. The horizontally and vertically movement of the attachable arms permit the cart to be attached to different wheelchairs. The attachable arms have ends that are easily attached and detached from the foot rest supports. In one embodiment, the attachment arms have a U-shaped end that fits around the foot rest support and is held in place by a strap, the ends of which may be secured by any one of buckles, snaps and hook and loop fasteners.

14 Claims, 3 Drawing Sheets

WHEELCHAIR ATTACHABLE SHOPPING CART

FIELD OF THE INVENTION

The invention relates to shopping carts, and more particularly to a shopping cart attachable to a wheelchair for use by disable persons.

BACKGROUND OF THE INVENTION

Most shopping carts found in stores are for person able to walk and push the carts around the store. Some stores provide a scooter or motorized type cart that a person may ride. There is a small basket on the front. The use of these cars requires that the person is able to move around and mount the cart. Persons in wheelchairs may not be able to move from the wheelchair to the motorized cart.

There have been some carts that attached to the back of the wheel chair. This is an inconvenient in that the person may not be able to reach the cart behind the wheelchair. Such a system is found in U.S. Pat. No. 6,186,528.

A shopping cart attachable to a wheelchair is described in U.S. Pat. No. 4,305,601. The cart is attached to the frame of the wheelchair below the arm rest on one side of the wheelchair. The one side connection between the cart and the wheelchair does not appear to provide a stable connection.

U.S. Pat. No. 4,484,755 describes a cart attachable to a wheelchair. The cart is securely attached to the wheelchair armrest supports on both sides of the wheelchair. This method of attachment prevents a person from entering or leaving the wheelchair while the cart is attached.

SUMMARY OF THE INVENTION

The invention is a shopping cart that is securely attachable to the foot rest supports of a wheel chair in a manner allowing a person to enter and depart the wheelchair while the cart is attached. Two attachable arms that are moveable horizontally and vertically attached to the each foot rest support in a low position. The horizontally and vertically movement of the attachable arms permit the cart to be attached to different wheelchairs. The attachable arms have ends that are easily attached and detached from the foot rest supports. In one embodiment, the attachment arms have a U-shaped end that fits around the foot rest support and is held in place by a strap, the ends of which may be secured by any one of buckles, snaps and hook and loop fasteners.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
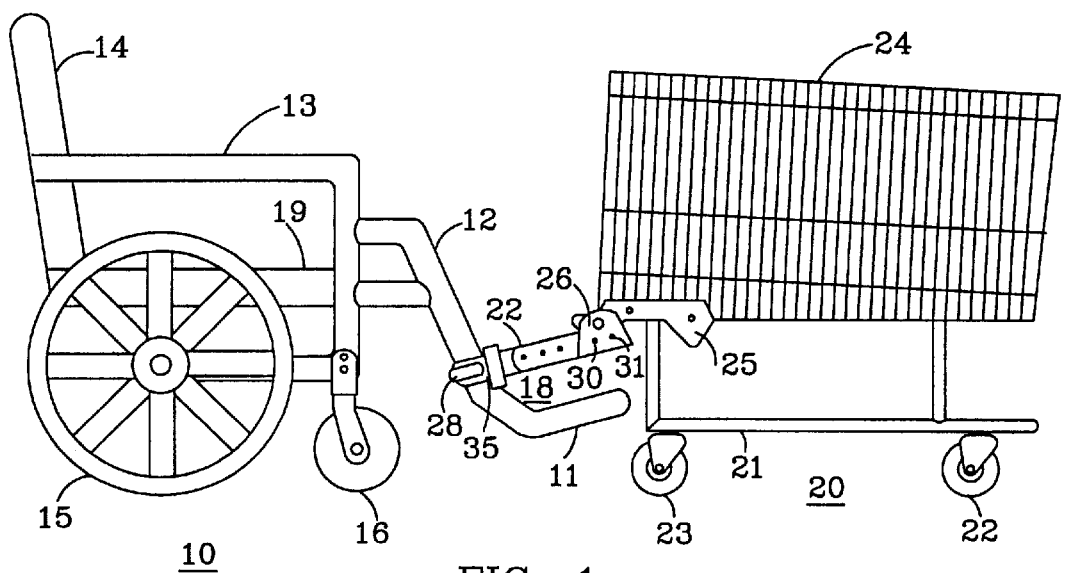
FIG. 1 shows the shopping cart attached to a wheelchair.

FIG. 1 shows the shopping cart 20 attached to a wheelchair 10. Wheelchair 10 includes hand wheel 15 and from roller wheel 16, seat 19 with back support 14, arm rest 13, and foot support 11 attached to frame support 12.

Attached to foot support frame support 12 is an attachment apparatus 18 which connects cart 20 with wheelchair 10. Cart 20 includes frame 21 with front wheels 22 and rear wheels 23. There are two each of wheels 22 and 23. Basket 24 is mounted on frame 21. Attachment apparatus 18 is attached to two brackets 25, one on each side of basket 24. Attached to brackets 25 are plates 26. Extending between plates 26 are two rods 30 and 31 on which two attachment arms 22 (only one shown in FIG. 1) are mounted. Arms 22 have a U-shaped ends which are mounted around frame supports 12, and secured thereto by a fasteners 28. Attachment arms are movable horizontally on rods 30 and 31 and move up and down vertically to adjust to the position of supports 12 on any wheelchair. By attaching to supports 12 and being adjustable, attachment arms 22 may be place low enough for a person to step over them and enter and exit the wheelchair with the cart attached.

Figure 2:
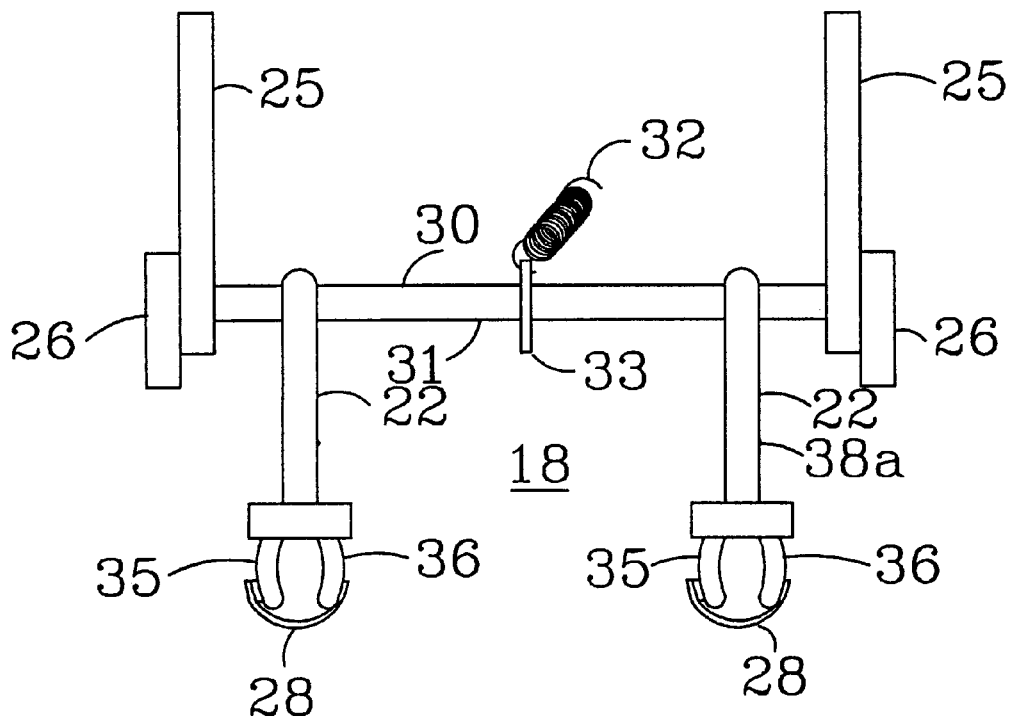
FIG. 2 is a top view of the apparatus attached to the shopping cart which is used to attach to the wheelchair.

FIG. 2 is a top view of attachment apparatus 18. Each plate 26 is secured to a plate 25. Rods 30 and 31 extend between and are attached to the plates 26. Attachment arms 22 are mounted on rods 30 and 31 and have U-shaped ends that attached to the wheelchair foot support frame 12. The two sides 35 and 36 of the U-shaped ends are mounted around support frame 12 and secured thereto by a strap 28. The side 35 and 36 may also be plat plates that extend form the end of arm 22, proving a space between which support frame 12 my placed. Strap 28 may be secured round support frame 12 by snaps, buckles or hook and loop fasteners.

Rods 30 and 31 extend through plate 33, one end of which is attached to spring 32. The end of spring 32 that is not attached to plated 33 is attached to the bottom of basket 24 (not illustrated in FIG. 2). Attachment arms 22 will flex upon and down vertically on rods 30 and 31. Spring 32 holds attachment arms 22 in an upward position when they are not secured to a wheelchair. Spring 32 is not necessary for the operation of attachment apparatus 18. Spring 32 only holds arms 22 upward when not attached to a wheelchair. Arms 22 also slide horizontally on rods 30 and 31 to allow them to be positioned to match the width of frame supports 12 on the wheel chair.

Figure 3:
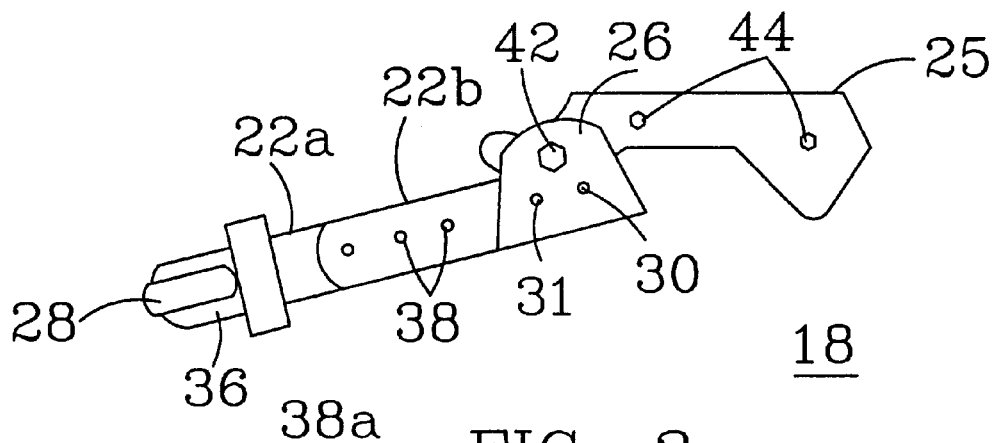
FIG. 3 is a side view of the attachment apparatus.

FIG. 3 is a side view of attachment apparatus 18. Plate 26 is attached to bracket 25 by a bolt or weld 42. The ends of rods 30 and 31 are secured to plate 26. Attachment arms 22 may be two parts 22a and 22b with part 22a slidably mounted in part 22b and held in one of several positions by a spring loaded pin that extends out through holes 38. In this manner, the length of the attachment arms may be adjusted to vary the position or distance of cart 20 from wheelchair 10. Persons with longer legs would require the cart 20 to be a further position from the wheelchair.

Figure 4:
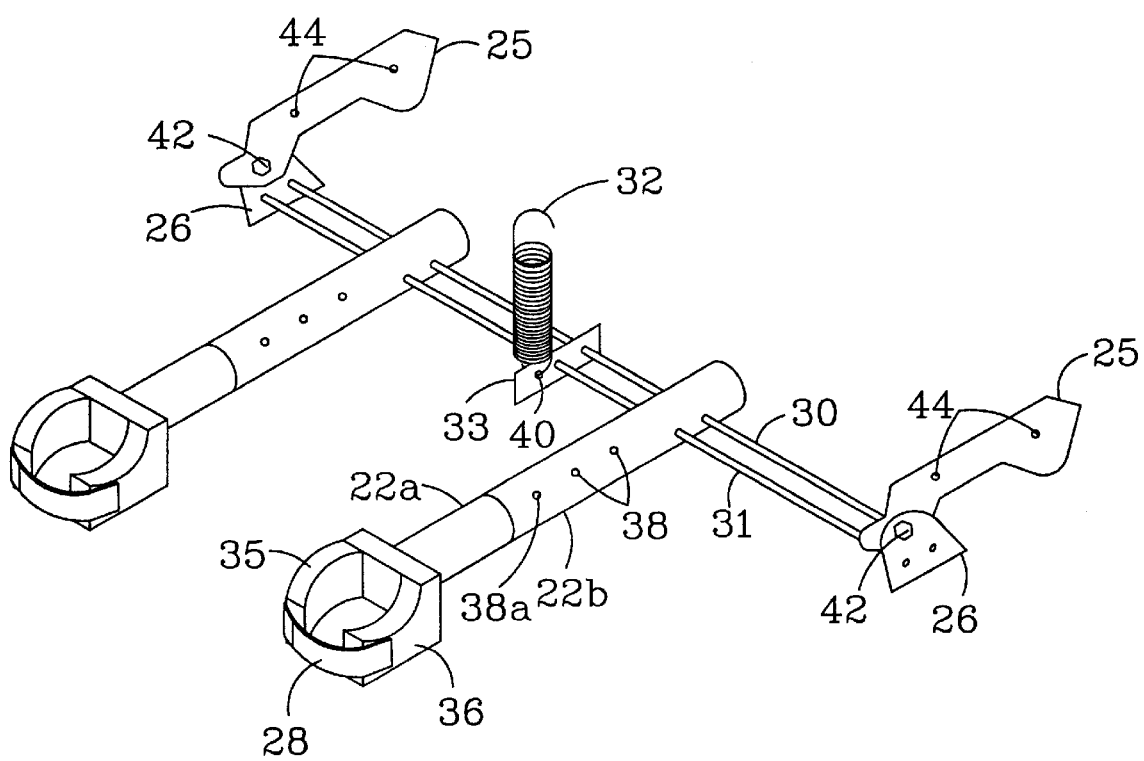
FIG. 4 is an isometric view of the attachment apparatus.

FIG. 4 is an isometric view of the attachment apparatus 18. Brackets 25 are secured to the shopping cart by bolts (not shown) that are inserted through openings 44, as shown in FIG. 1. Plates 26 are attached to plates 25 by bolts, rivets, or welding. Rods 30 and 31 are attached to and extend between plates 26. Attachment arms 22 are slidably mounted on rods 30 and 31 so that they may be moved independent of each other in a horizontal direction. This allow attachment arms 22 to be adjusted to connect to frame supports 12 on wheelchair 10. Attachment arms 22 will also move up and down vertically since rods 30 and 31 are flexible. Attachment arms 22 are held in an upward position, when not attached to frame supports 22, by spring 32. Spring 32 is attached at one end to rods 30 and 31 and to the shopping cart basket 24 under which attachment apparatus 18 is mounted, as illustrated in FIG. 1. Attachment arms 22 may be adjusted as to length utilizing the slidable mounted two parts 22a and 22b, and the spring loaded locking pin 38a and openings 38. Utilizing the adjustable lengths of attachment arms 22, the distance from the shopping cart to the wheel chair may be adjusted to accommodate both short and tall persons. Since the attachment arms are attached to the support frames 12 of the foot rest 11, a person may enter and leave the wheelchair without detaching the shopping cart.

What is claimed is:

1. A shopping cart apparatus for attaching to a wheelchair having a foot rest and frame for holding the foot rest, comprising:
    a shopping cart including a wheeled frame having a basket thereon;
    an attachment apparatus for attaching the shopping cart to a foot rest frame of the wheel chair, said attachment apparatus including:
        a pair of brackets attachable to said shopping cart;
        a pair of slidable attachment arms for attaching to the wheel chair foot rest frame; and
        a pair of rods extending between said brackets, said rods being flexible to allow the attachment arms to move upon and down vertically.

2. The shopping cart apparatus according to claim 1, including mounting means for said attachment arms to allow them to move horizontally.

3. The shopping cart apparatus according to claim 1, including a plate through which said rods extend, and a spring to hold the attachment arms in an upward position when not attached to a wheelchair.

4. The shopping cart apparatus according to claim 1, including a securing device on each of said attachment arms to securely attach said attachment arms to said wheelchair foot rest frame.

5. The shopping cart apparatus according to claim 4, wherein said securing devices are selected from buckle, snap and hook and loop fasteners.

6. The shopping cart apparatus according to claim 1, wherein each attachment arm has a U-shaped end for positioning around the wheelchair foot rest frame.

7. The shopping cart apparatus according to claim 1, wherein said attachment arms each include two pieces, one telescoping into the other to provide an adjustable length for the attachment arms.

8. A shopping cart apparatus for attaching to a wheelchair having a foot rest and frame for holding the foot rest, comprising:
    a shopping cart including a wheeled frame having a basket thereon; and
    an attachment apparatus for attaching the shopping cart to a foot rest frame of the wheel chair, said attachment apparatus including:
        a pair of brackets attachable to said shopping cart;
        a pair of adjustable length attachment arms for attaching to the wheel chair foot rest frame, and
        a pair of rods extending between said brackets, said rods being flexible to allow the attachment arms to move upon and down vertically.

9. The shopping cart apparatus according to claims 8, including mounting means for said attachment arms to allow them to move horizontally.

10. The shopping cart apparatus according to claim 8, including a plate through which said rods extend, and a spring to hold the attachment arms in an upward position when not attached to a wheelchair.

11. The shopping cart apparatus according to claim 8, including a securing device on each of said attachment arms to securely attach said attachment arms to said wheelchair foot rest frame.

12. The shopping cart apparatus according to claim 11, wherein said securing devices are selected from buckle, snap and hook and loop fasteners.

13. The shopping cart apparatus according to claim 8, wherein each attachment arm has a U-shaped end for positioning around the wheelchair foot rest frame.

14. The shopping cart apparatus according to claim 8, wherein said adjustable length attachment arms each include two pieces, one telescoping into the other to provide an adjustable length for the attachment arms.

* * * * *